United States Patent
Kopanski

(10) Patent No.: US 10,538,315 B2
(45) Date of Patent: Jan. 21, 2020

(54) METHOD OF BALANCING A MAIN ROTOR HUB

(71) Applicant: Sikorsky Aircraft Corporation, Stratford, CT (US)

(72) Inventor: Krzysztof Kopanski, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 319 days.

(21) Appl. No.: 15/527,462

(22) PCT Filed: Nov. 19, 2015

(86) PCT No.: PCT/US2015/061466
§ 371 (c)(1),
(2) Date: May 17, 2017

(87) PCT Pub. No.: WO2016/081681
PCT Pub. Date: May 26, 2016

(65) Prior Publication Data
US 2017/0361926 A1 Dec. 21, 2017

Related U.S. Application Data

(60) Provisional application No. 62/081,720, filed on Nov. 19, 2014.

(51) Int. Cl.
*B64C 27/00* (2006.01)
(52) U.S. Cl.
CPC .......... *B64C 27/008* (2013.01); *B64C 27/001* (2013.01); *B64C 2027/003* (2013.01)

(58) Field of Classification Search
CPC ............ B64C 27/001; B64C 2027/003; B64C 27/008
See application file for complete search history.

(56) References Cited

U.S. PATENT DOCUMENTS

| 2,425,650 A | | 8/1947 | Stalker | |
|---|---|---|---|---|
| 4,372,431 A | * | 2/1983 | Desjardins | B64C 27/001 188/380 |
| 5,639,214 A | * | 6/1997 | Guimbal | B64C 27/001 416/145 |
| 5,647,726 A | | 7/1997 | Sehgal et al. | |

(Continued)

FOREIGN PATENT DOCUMENTS

WO 2014113114 A2 7/2014

OTHER PUBLICATIONS

Notification of Transmittal of the International Search Report for International Application No. PCT/US2015/061466 dated Mar. 3, 2016; dated Mar. 16, 2016; 7 pages.

(Continued)

*Primary Examiner* — Claude J Brown
(74) *Attorney, Agent, or Firm* — Cantor Colburn LLP

(57) ABSTRACT

A rotor system is provided including a rotor hub configured to rotate about an axis and a plurality of rotor blade assemblies mounted to the rotor hub and configured to rotate within a plane about the axis. A vibration reducing system is operably coupled to the rotor hub. The vibration reducing system is arranged at a position offset from a center of rotation of the rotor hub.

13 Claims, 4 Drawing Sheets

(56) References Cited

U.S. PATENT DOCUMENTS

| | | | |
|---|---|---|---|
| 6,045,090 A | 4/2000 | Krysinsky et al. | |
| 8,424,799 B2 | 4/2013 | Popelka et al. | |
| 2010/0221110 A1* | 9/2010 | Jolly | B64C 27/001 416/31 |
| 2011/0027081 A1* | 2/2011 | Jolly | B64C 27/001 416/1 |
| 2011/0097193 A1* | 4/2011 | Manfredotti | B64C 27/001 415/119 |
| 2011/0194934 A1 | 8/2011 | Popelka et al. | |
| 2012/0292434 A1 | 11/2012 | Welsh | |
| 2015/0175259 A1* | 6/2015 | Foskey | B64C 27/72 416/31 |
| 2015/0203196 A1* | 7/2015 | Heverly, II | B64C 27/001 701/3 |
| 2015/0232174 A1* | 8/2015 | Jolly | B64C 27/001 74/574.2 |

OTHER PUBLICATIONS

Written Opinion of the International Searching Authority for International Application No. PCT/US2015/061466 dated Mar. 3, 2016; dated Mar. 16, 2016; 5 pages.

* cited by examiner

METHOD OF BALANCING A MAIN ROTOR HUB

CROSS REFERENCE TO RELATED APPLICATIONS

This application is a National Stage application of PCT/US2015/061466, filed Nov. 19, 2015, which claims the benefit of U.S. Provisional Application No. 62/081,720, filed Nov. 19, 2014, both of which are incorporated by reference in their entirety herein.

BACKGROUND OF THE INVENTION

Exemplary embodiments of the invention relate to a rotary wing aircraft, and more particularly, to a system and method for reducing vibrations generated by a main rotor hub of a rotary wing aircraft.

Vibration is a mechanical phenomenon whereby oscillations occur about an equilibrium point. While vibration in a given system is occasionally desirable, it is more often undesirable due to the tendency of vibrations to waste energy, create noise and have deleterious effects on mission performance. In aircraft operations, such as single-rotor helicopters or helicopters with coaxial, counter-rotating main rotors, vibrations may be cause by normal rotor operation. These vibrations as well as other types of vibrations (e.g., those caused by damage) are transmitted to the airframe and can lead to uncomfortable flight conditions or damage. Thus, it is often required that at least a portion of the generated vibrations be mitigated or reduced.

Conventional vibration reduction systems use fixed weights mounted to each of the rotor blades to provide a damping at a first frequency. In addition, weights are positioned about the center of rotation of a main rotor system and are designed to rotate with the rotor system to effectively interfere with and mitigate the vibrations. The weights mounted to the rotor hub are intended to mitigate vibrations at the same first frequency. The fixed weights mounted to the rotor blades are intended to provide coarse adjustment at a rotor blade lever and the weights mounted to the rotor hub provide fine adjustment at the aircraft level. However, these current systems are time consuming to install and the balancing of the rotor blades may only occur when the aircraft is grounded.

BRIEF DESCRIPTION OF THE INVENTION

According to one embodiment of the invention, a rotor system is provided including a rotor hub configured to rotate about an axis and a plurality of rotor blade assemblies mounted to the rotor hub and configured to rotate within a plane about the axis. A vibration reducing system is operably coupled to the rotor hub. The vibration reducing system is arranged at a position offset from a center of rotation of the rotor hub.

In addition to one or more of the features described above, or as an alternative, in further embodiments the rotor system includes a mechanism having a movable platform mounted to the rotor hub. The vibration reducing system is attached to the movable platform such that the mechanism is configured to move the vibration reducing system relative to the rotor hub.

In addition to one or more of the features described above, or as an alternative, in further embodiments the movable platform is moved manually.

In addition to one or more of the features described above, or as an alternative, in further embodiments the movable platform is configured to move automatically in response to a controller operably coupled thereto.

In addition to one or more of the features described above, or as an alternative, in further embodiments the vibration reducing system is a bi-filar system.

In addition to one or more of the features described above, or as an alternative, in further embodiments the vibration reducing system is a hub mounted vibration system (HMVS).

According to another embodiment of the invention, a rotary wing aircraft is provided including an airframe and a main rotor system operably coupled to the airframe. The main rotor system is rotatable about an axis and includes a rotor hub and a plurality of rotor blade assemblies mounted to the rotor hub and configured to rotate within a plane about the axis. A vibration reducing system is operably coupled to the rotor hub. The vibration reducing system is arranged at a position offset from a center of rotation of the rotor hub In addition to one or more of the features described above, or as an alternative, in further embodiments the rotor system further includes a mechanism having a movable platform mounted to the rotor hub. The vibration reducing system is attached to the movable platform such that the mechanism is configured to move the vibration reducing system relative to the rotor hub.

In addition to one or more of the features described above, or as an alternative, in further embodiments the movable platform is moved manually.

In addition to one or more of the features described above, or as an alternative, in further embodiments the movable platform is configured to move automatically in response to a controller operably coupled thereto.

In addition to one or more of the features described above, or as an alternative, in further embodiments the vibration reducing system is a bi-filar system.

In addition to one or more of the features described above, or as an alternative, in further embodiments the vibration reducing system is a hub mounted vibration system (HMVS).

According to yet another embodiment of the invention, a method of suppressing vibrations of a rotary wing aircraft is provided including measuring an imbalance between a plurality of rotor blade assemblies mounted to a rotor hub of a rotor system of the rotary wing aircraft. A balanced position of a vibration reduction system is determined. The balanced position is offset from a center of the rotor hub. The vibration reduction system is moved to the balanced position.

In addition to one or more of the features described above, or as an alternative, in further embodiments moving of the vibration reduction system to the balanced position occurs manually.

In addition to one or more of the features described above, or as an alternative, in further embodiments measuring the imbalance, determining the balanced position, and moving the vibration reduction system to the balanced position occurs automatically.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
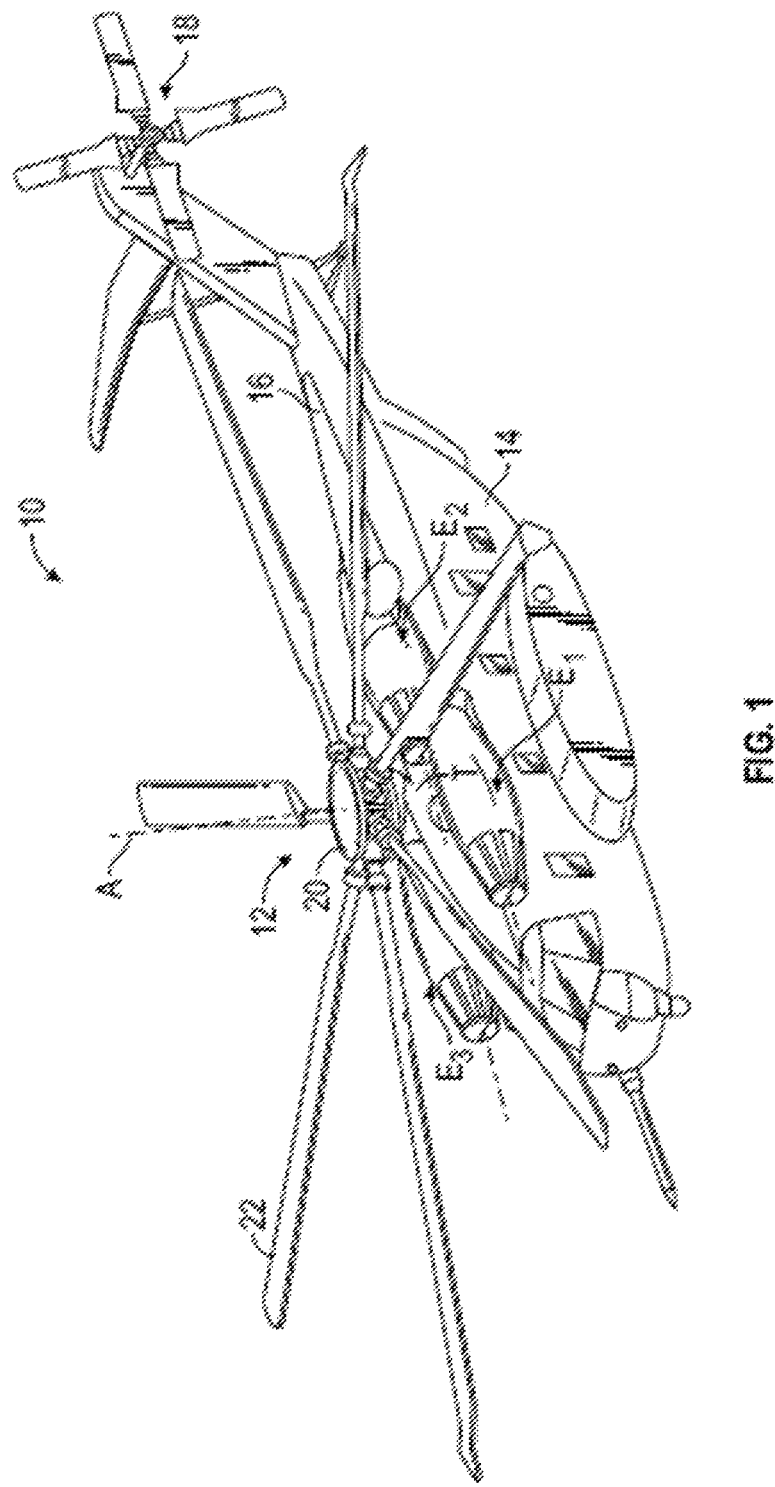
FIG. 1 is a perspective view of an exemplary rotary wing aircraft.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

The rotation of the main rotor assembly 12 and the rotor blade assemblies 22 associated therewith may transfer vibratory loads to the airframe 14. To suppress vibration of the airframe 14 resulting from, for example, rotation of the main rotor assembly 12 about the main rotor axis A, a plurality of dead mass weights (not shown) are installed within the interior of each rotor blade 22, such as near a blade tip for example. The weights positioned within the interior of each rotor blade 22 are configured to make the rotor blades 22 as similar to one another as possible prior to the rotor blades 22 being installed on an aircraft 10. Conventional aircrafts 10 typically also include a first plurality of weights (not shown) mounted to the rotor hub 20 to correct for a 1 per revolution of imbalance on the rotor head caused by the center of gravity of the rotor assembly being offset from the axis of rotation A. In addition, a vibration reduction system 30 (FIGS. 2 and 3) is mounted to the rotor hub 20 for rotation with the main rotor assembly 12. The vibration reduction system 30 includes a plurality of weights configured to balance the main rotor blades 22 about the rotational axis of the main rotor hub 20 and provide a 3 per revolution vibration suppression. By reducing the imbalance of the main rotor blade assemblies 22, the vibration generated during operation of the main rotor system 12 is limited.

Figure 2:
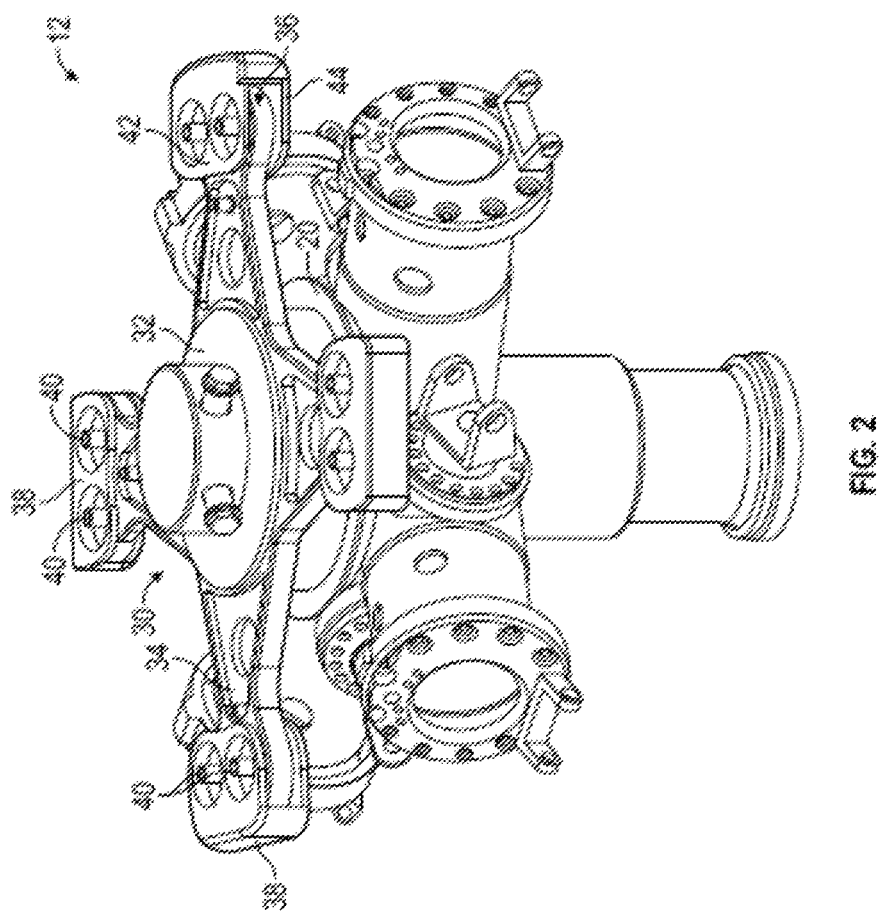
FIG. 2 is a perspective view of a vibration reduction system mounted to a main rotor hub of a rotary wing aircraft according to an embodiment of the invention.

In one embodiment, illustrated in FIG. 2, the vibration reduction system 30 is a bi-filar system including a central member 32 having a plurality of elongate members 34 extending radially outward from the central member 32 in a plane parallel to the plane of the blade rotation. A bi-filar vibration absorber 38 is coupled to the distal end 36 of each elongate member 34 with one or more pins 40. As shown, each bi-filar vibration absorber 38 is generally U-shaped such that the two opposing side plates 42, 44 thereof are configured to surround the end 36 of the elongate member 34.

Figure 3:
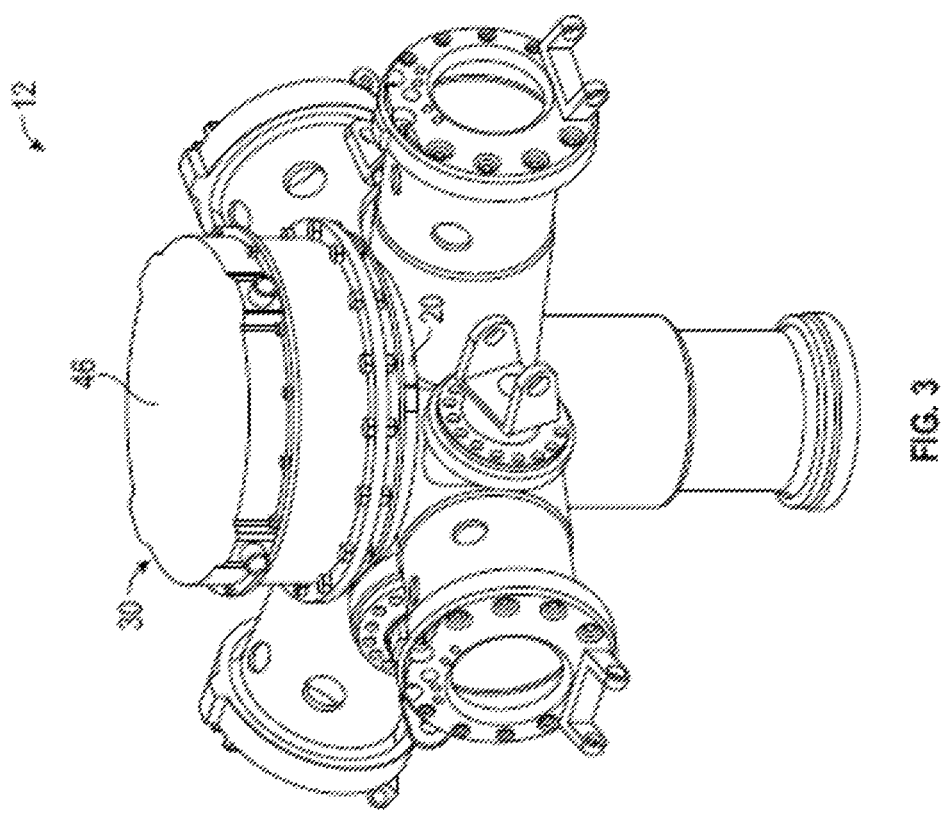
FIG. 3 is a perspective view of another vibration reduction system mounted to a main rotor hub of a rotary wing aircraft according to an embodiment of the invention.

In another embodiment, illustrated in FIG. 3, the vibration reduction system 30 includes an active hub mounted vibration suppressor (HMVS). The HMVS includes a drum-like hub housing 46 having at least a first hub mounted motor driven hub mass (not shown) and at least a second hub mounted motor driven hub mass (not shown) enclosed therein. As the hub mounted masses arranged on the inside of the hub housing 46 rotate with the main rotor system 12, the masses offset the imbalances generated by any dissimilarity between the rotor blade assemblies 22.

Figure 4:
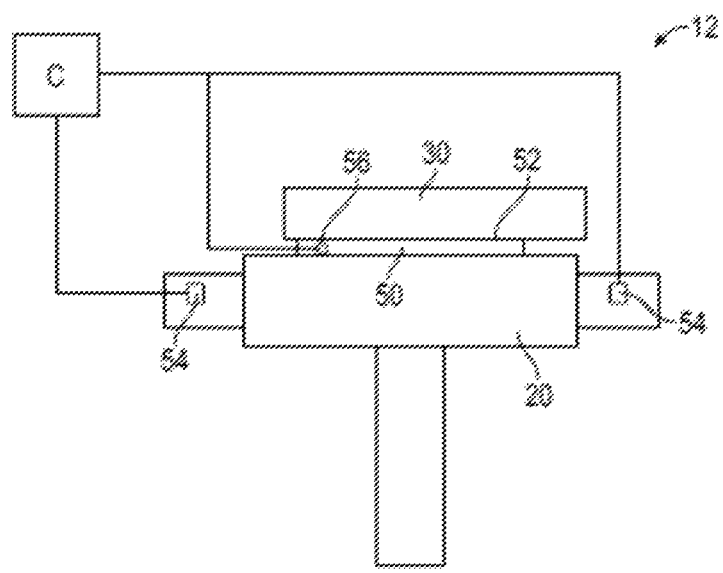
FIG. 4 is a cross-sectional view of a vibration reduction system mounted to a main rotor hub of a rotary wing aircraft according to an embodiment of the invention.
Figure 5:
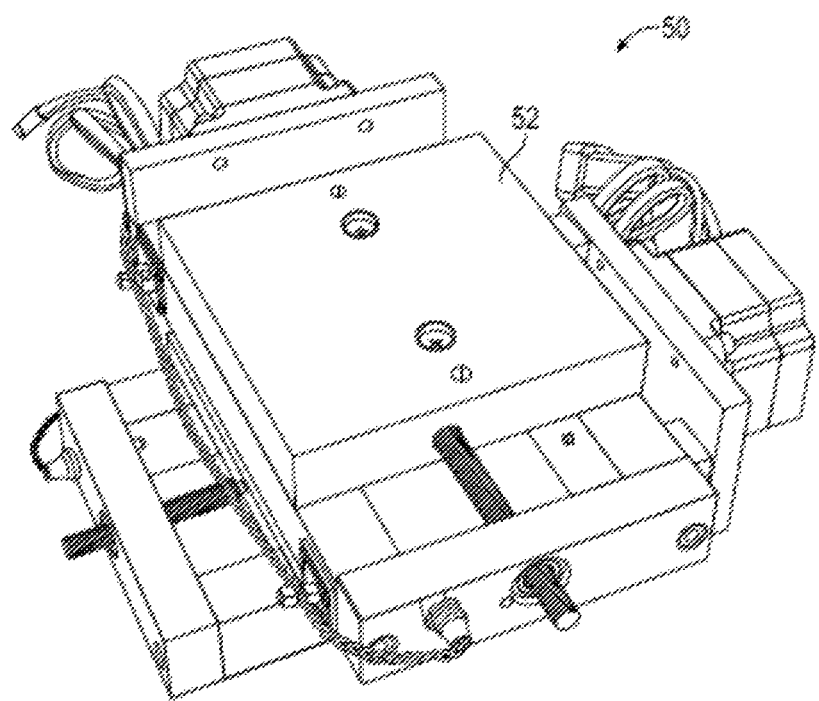
FIG. 5 is a perspective view of an example of a mechanism having a movable platform configured to couple the vibration reduction system to the main rotor rub according to an embodiment of the invention.

While shown as being on the center of the main rotor axis A, in an aspect of the invention, the vibration reduction system 30 is directly mounted to the rotor hub 20 at a location sufficiently off of the main rotor axis A to reduce vibration and balance the hub 20. With reference now to the embodiments in FIGS. 4 and 5, the vibration reduction system 30 is indirectly mounted to the rotor hub 20. As shown, a mechanism 50 having a movable platform 52 is interposed between the vibration reduction system 30 and the rotor hub 20. One example of mechanism 50 is a lead screw motion platform, as illustrated in FIG. 5. However, other mechanisms 50 having a platform or other planar surface 52 movable in at least a first direction and a second direction are within the scope of the invention. The size of the mechanism 50 is selected to adequately transfer all of the loads from the vibration reduction system 30 to the rotor hub 20 while fitting within a desired size envelope. By mounting the vibration reduction system 30 to the movable platform 52, the mechanism 50 is configured to move the vibration reduction system 30 a minimum distance in each direction, away from the center of rotation of the rotor hub 20, to create a balancing moment that offsets the imbalance generated by the rotor blade assemblies 22. Therefore, the mechanism 50 should be able to hold its position during operation of the main rotor system 12, such as when the aircraft 10 is in flight for example.

In one embodiment, adjustment of the mechanism 50 occurs manually, such as by a mechanic while the rotary wing aircraft 10 is on the ground. Alternatively, the mechanism 50 may be configured to move automatically in response to a command from a controller C. For example, a plurality of sensors 54, such as accelerometers for example, may be positioned about the rotor hub 20 and configured to monitor the loading of the rotor blades 22. In response to the measured accelerations, the controller C, will determine a balance position of the mechanism 50 and will move the platform 52 accordingly, such as via one of more actuators 56. In this configuration, the balance can occur both with the rotor blades 22 spinning (e.g., on the ground or in flight), as well as when the rotor blades 22 are not spinning.

By mounting the vibration reducing system on a mechanism 50 having a movable platform 52, the vibration reducing system 30 may be positioned offset from the center of rotation of the hub 20. As a result, the 1 per revolution correction may be incorporated into the vibration reducing system 30, thereby eliminating the need for the first plurality of dead weights mounted to the rotor hub 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor system, comprising:
    a rotor hub configured to rotate about an axis;
    a plurality of rotor blade assemblies mounted to the rotor hub and configured to rotate within a plane about the axis;
    a vibration reducing system operably coupled to the rotor hub, the vibration reducing system being arranged at a position offset from a center of rotation of the rotor hub; and
    a mechanism having a movable platform mounted to the rotor hub, the vibration reducing system being attached to the movable platform such that the mechanism is configured to move the vibration reducing system relative to the rotor hub.

2. The rotor system according to claim 1, wherein the movable platform is moved manually.

3. The rotor system according to claim 1, wherein the movable platform is configured to move automatically in response to a controller operably coupled thereto.

4. The rotor system according to claim 1, wherein the vibration reducing system is a bi-filar system.

5. The rotor system according to claim 1, wherein the vibration reducing system is a hub mounted vibration system (HMVS).

6. A rotary wing aircraft, comprising:
    an airframe;
    a main rotor system operably coupled to the airframe, the main rotor system being rotatable about an axis, the main rotor system including:
    a rotor hub;
    a plurality of rotor blade assemblies mounted to the rotor hub and configured to rotate within a plane about the axis;
    a vibration reducing system operably coupled to the rotor hub, the vibration reducing system being arranged at a position offset from a center of rotation of the rotor hub; and
    a mechanism having a movable platform mounted to the rotor hub, the vibration reducing system being attached to the movable platform such that the mechanism is configured to move the vibration reducing system relative to the rotor hub.

7. The rotary wing aircraft according to claim 6, wherein the movable platform is moved manually.

8. The rotary wing aircraft according to claim 6, wherein the movable platform is configured to move automatically in response to a controller operably coupled thereto.

9. The rotary wing aircraft according to claim 6, wherein the vibration reducing system is a bi-filar system.

10. The rotary wing aircraft according to claim 6, wherein the vibration reducing system is a hub mounted vibration system (HMVS).

11. A method of suppressing vibrations of a rotary wing aircraft, comprising:
    measuring an imbalance between a plurality of rotor blade assemblies mounted to a rotor hub of a rotor system of the rotary wing aircraft;
    determining a balanced position of a vibration reduction system, the balanced position being offset from a center of the rotor hub; and
    moving the vibration reduction system to the balanced position.

12. The method according to claim 11, wherein moving of the vibration reduction system to the balanced position occurs manually.

13. The method according to claim 11, wherein at least one of measuring the imbalance, determining the balanced position, and moving the vibration reduction system to the balanced position occur automatically.

* * * * *